United States Patent [19]

Ellin

[11] B 3,927,412
[45] Dec. 16, 1975

[54] ADAPTER FOR USE WITH A PACKAGED FLASHLAMP ARRAY

[75] Inventor: Seymour Ellin, Chestnut Hill, Mass.

[73] Assignee: Polaroid Corporation, Cambridge, Mass.

[22] Filed: July 26, 1973

[21] Appl. No.: 383,465

[44] Published under the Trial Voluntary Protest Program on January 28, 1975 as document no. B 383,465.

[52] U.S. Cl. .................. 354/143; 240/1.3; 354/147
[51] Int. Cl.² .................... G03B 15/03; G03B 15/02
[58] Field of Search ............ 95/11.5 R, 11 L, 11 P; 240/1.3; 354/143, 140, 147

[56] References Cited
UNITED STATES PATENTS

| | | |
|---|---|---|
| 3,550,514 | 12/1970 | Harvey .............................. 95/11 L |
| 3,618,492 | 11/1971 | Ellin ................................. 240/1.3 X |
| 3,676,045 | 7/1972 | Watrous et al ................ 95/11.5 UX |
| 3,699,861 | 10/1972 | Burgarella et al ................ 95/11.5 R |
| 3,728,947 | 4/1973 | Harnden et al. .................. 95/11.5 R |

Primary Examiner—Richard A. Wintercorn
Attorney, Agent, or Firm—Gerald L. Smith; Edward S. Roman

[57] ABSTRACT

Apparatus for converting a conventional camera to operate in conjunction with a packaged linear array of flashlamps. The adapter arrangement includes a flash firing circuit as well as a control feature wherein a selected flashlamp in the array is not ignited until a select interval following synchronization switch actuation. Further, the apparatus includes control features selectively limiting the period of energization of the flash firing circuit as well as a powering arrangement for deriving the unique electrical firing signals required for use with electronic flash firing circuits.

36 Claims, 16 Drawing Figures

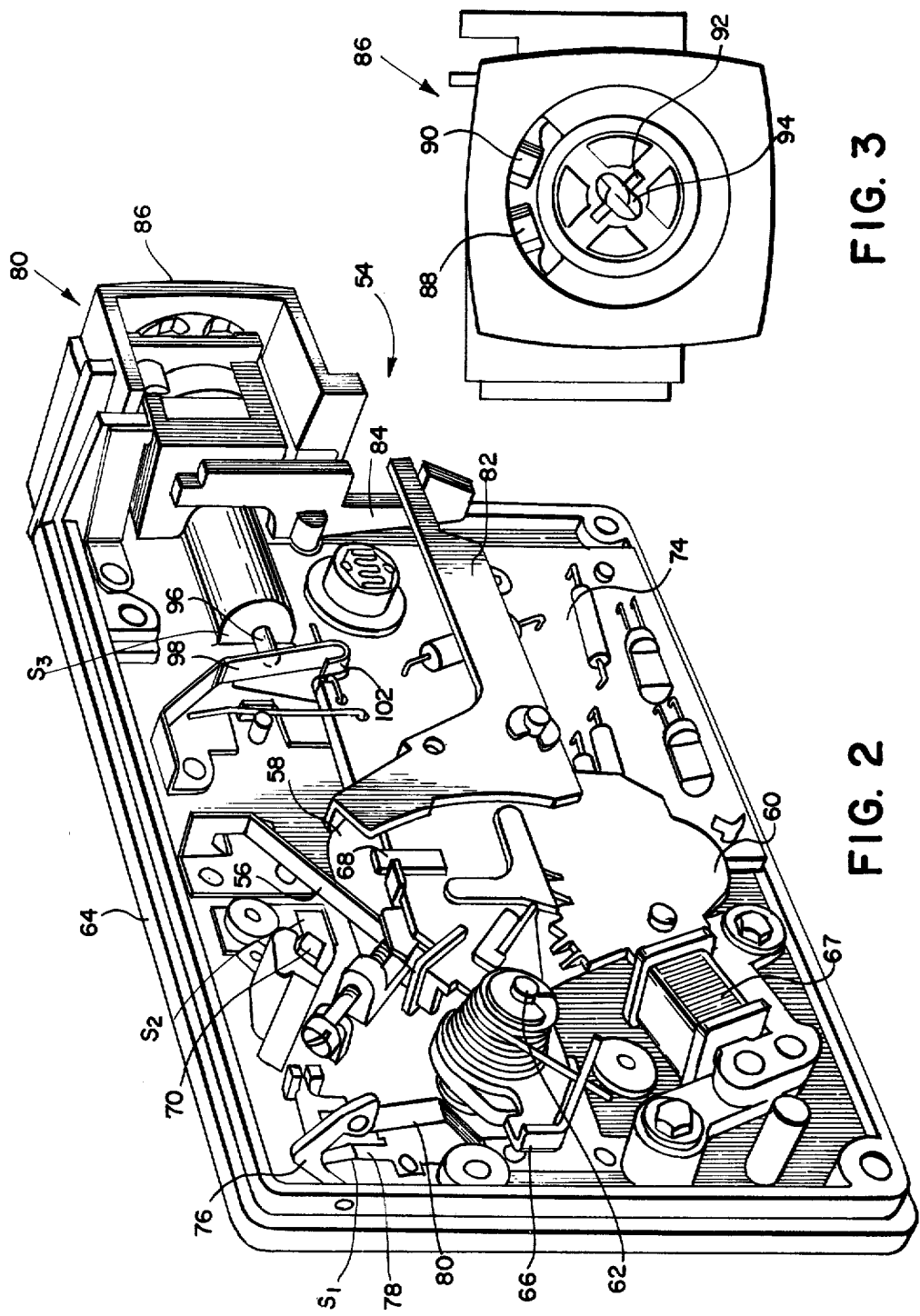

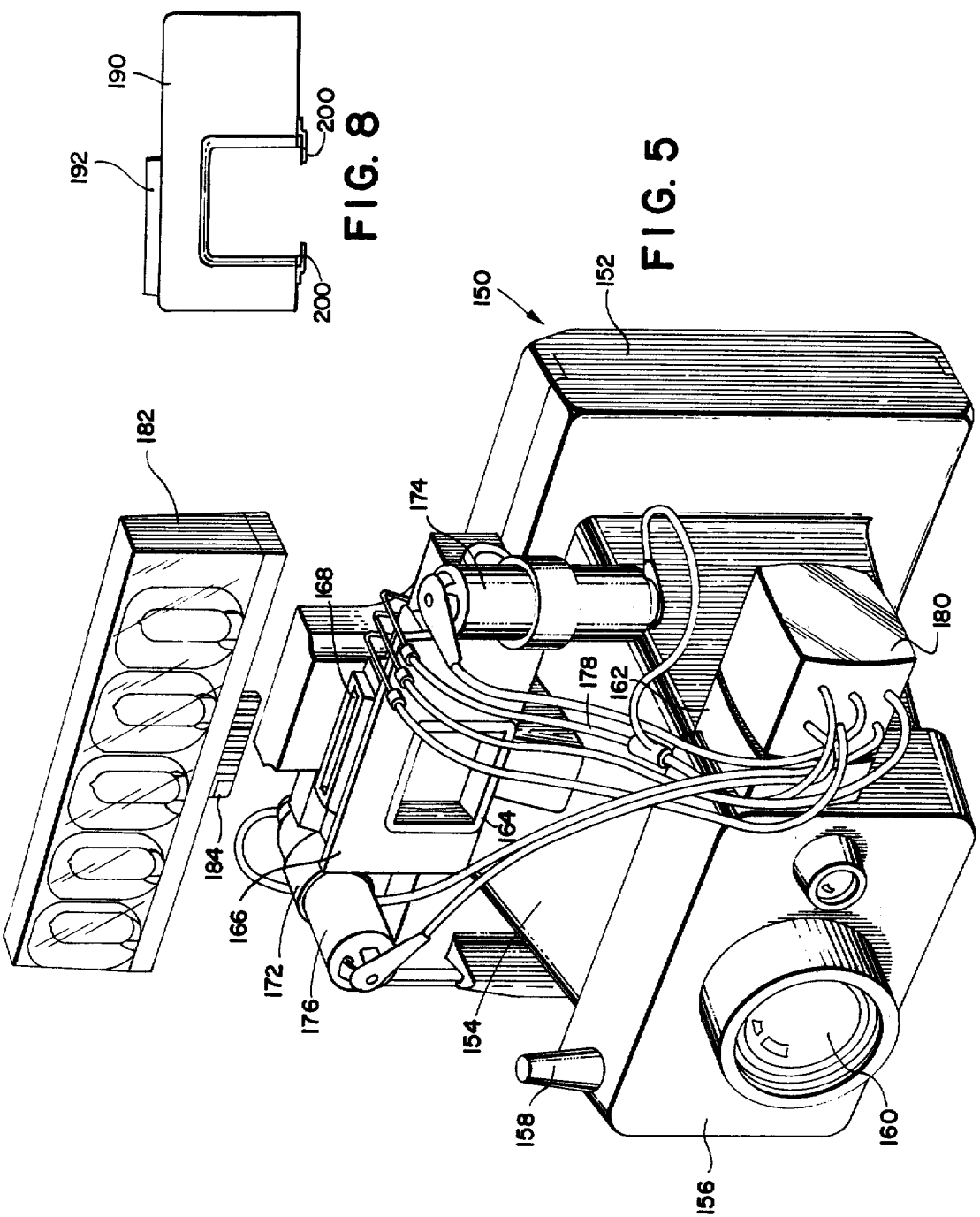

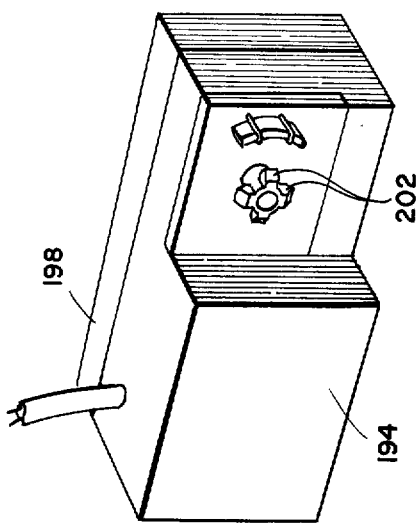
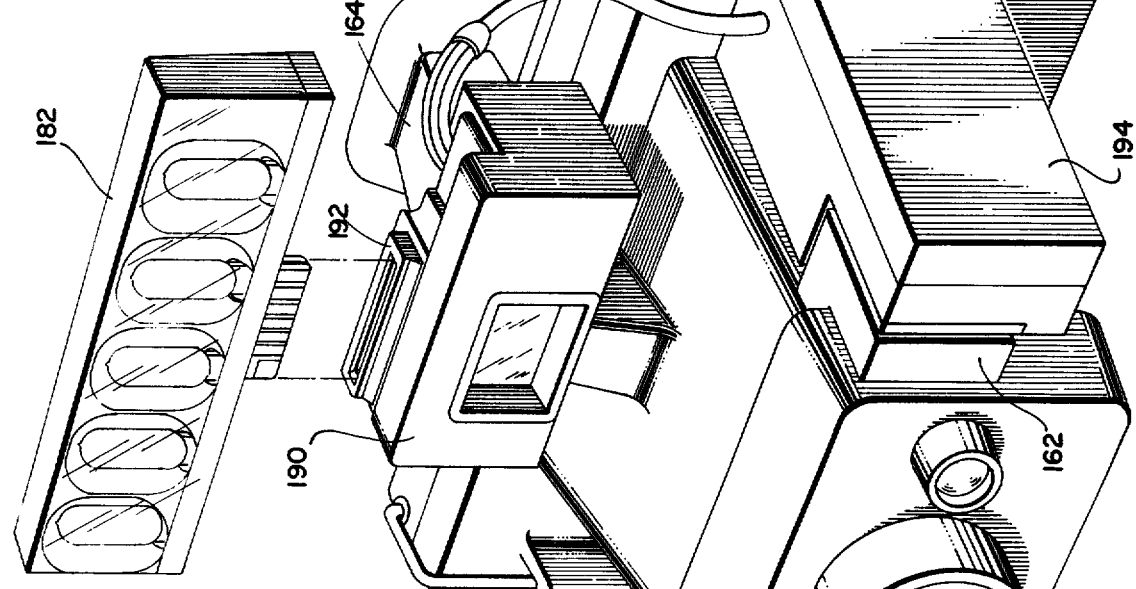
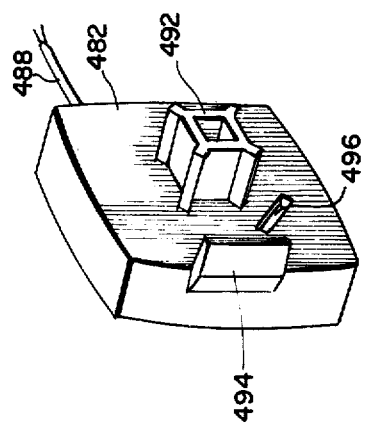
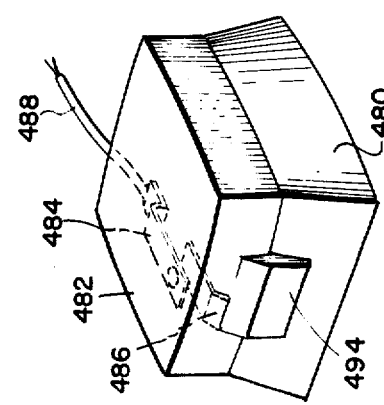

ADAPTER FOR USE WITH A PACKAGED FLASHLAMP ARRAY

BACKGROUND

A significant percentage of photographic snapshots are taken with simple amateur cameras utilizing the artificial illumination of a cubically packaged multilamp flash unit. Commonly identified as a "flashcube", these packaged flash units are formed of four flashlamps mounted upon a generally square base supporting structure of internationally standardized design. In accordance with this standardized design, the base structures of the cubes are fashioned to include a hollow supportive post having outwardly extending lugs. From each included flashlamp, each base also supports respective lead or igniting wires which are externally exposed along the side and lower surfaces thereof to provide for contact with a pair of corresponding terminals positioned within a camera support structure. These corresponding camera flashcube mounts may assume a variety of configurations, however, all serve to orient a mounted flashcube for scene illumination as well as to index it to position successive flashlamps for scene illumination.

To fire or ignite a flashlamp within each flashcube, cameras typically include a battery power supply, which may vary somewhat widely in voltage and current characteristics, as well as a synchronization switch which is closed by a shutter in the course of an exposure interval to supply igniting current to the igniting filament of a properly mounted and oriented flashlamp through the noted terminal connections. Where snapshot cameras are designed to utilize a form of automatic exposure regulation, the shutters thereof usually are called upon to operate slightly differently when in a flash illuminational mode. Generally, a fixed as opposed to light responsive variable exposure interval is provided by the automatic systems. As a consequence, the flashcube mounting structure of such cameras also will include some form of actuating device which will close a switch or the like within the exposure control system in response to the mounting of the flashcube. This switch closure then serves to alter the exposure control system for flash operation.

Another packaging arrangement for flashlamps recently has been introduced to the amateur photographic market. As described in U.S. Pat. Nos. 3,598,984 and 3,598,985, this packaging arrangement positions an array of five flashlamps in each of two linear rows facing in opposite directions. The igniting terminals for each flashlamp on each side of the array are connected by printed circuit technique to a downwardly extending blade mount, each side of which is configured to expose five input contacts and a common lead for selectively supplying current to successive ones of the outwardly facing lamps of the array. The linear array affords significant convenience to the camera operator over a conventional cubic packaging design. For instance, with the thin linear packaging structure, ten flashlamps conveniently may be carried in a pocket of a garment and no mechanical system is required for rotating the array for any series of five flash illuminated exposures. A variety of techniques have been devised for firing the flashlamps within the linear array in a predetermined sequence, the more convenient of these utilizing integrated circuitry of a highly miniaturized nature. Typical designs for such sequencing circuits are described in detail in U.S. Pat. Nos. 3,676,045 and 3,618,492. Inasmuch as electronic logic techniques are utilized by such circuits to fire the array of flashlamps in proper sequence, it is necessary that the input voltages thereto be within predetermined limits. Additionally, certain of these circuits are designed to respond only to a relatively high voltage impulse or "spike" as may be derived from the instantaneous powering-down of an inductive network. To adapt such circuits for use with conventional cameras requires a select form of electrical simulation.

Another difficulty inherent in utilizing an integrated electronic circuit of the type described within an adapter accommodating snapshot cameras to use with linear flash arrays resides in the energization requirement for such circuits. Because of their delicacy, it is necessary that the period of time during which the circuits themselves are energized be limited. Where the circuits form part of another complex operational cycle control circuit, no difficulties in this regard arise. However, where the only logic input to the flash firing circuits resides in the actuation of either a start or a synchronization switch, their electronic logic integrity may be compromised severely. Generally, such circuits should be activated or energized for not more than about 40 milliseconds. Further, to provide such adaptive devices at necessarily low retail cost, any subsidiary electronics must be both inexpensive and simple.

Another requirement for such adapters resides in the lighting effects which may be derived from a rather elongate linear flash unit. Such flash units should be positioned above the taking lens of the snapshot camera a sufficient distance to avoid problems of "red eye", grotesque shadowing and the like. In the latter respect, should a flashlamp be positioned such that it is oriented below the taking lens of such cameras, grotesque shadow effects may be witnessed in a resulting image of a human subject.

Another aspect of accommodating the noted sequencing circuits to operation with conventional snapshot cameras resides in the vagaries encountered in typical mechanical actuations of synchronization switches and the like. For instance, should such switches bounce during their actuation, it is entirely possible that the sequencing circuits will react to each switch leaf intercontact to fire an unwanted sequence of several flashbulbs. Accordingly, any adaptive arrangement must accommodate for the various operational characteristics of typical, inexpensive snapshot cameras. Generally, the power supplies of such cameras cannot be used in view of the wide variation of their voltage and current values. However, advantage in simplicity may be realized with such utilization should it be available.

SUMMARY

The present invention is addressed to flash firing apparatus for photographic cameras and the like wherein a packaged linear flash array may be utilized in conjunction with an electronic sequential flashlamp selector firing circuit. Actuated from a conventional synchronization switch, the inventive apparatus serves both to activate the firing circuit under controlled power parameters and to actuate the circuit to fire a flashlamp utilizing a controlled signal immune from the mechanical vagaries typically encountered with conventional shutter actuated synchronization switches.

Another feature and object of the inventive apparatus resides in the provision of a flash photographic control arrangement operative to selectively limit the period of energization of a flashlamp selector and firing circuit substantially within the time envelope of a photographic exposure interval. As a further aspect, the control feature imposes a select delay in response to the initial closure of the blades of a shutter synchronization switch. Of highly limited duration, this delay serves to render the selector or sequencing circuit immune from switch bounce characteristics which may otherwise cause a multiplicity of flashlamp ignitions.

Another object and feature of the invention is to provide an adapter for mountably receiving a packaged linear flashlamp array and which may be utilized in conjunction with a conventional photographic camera incorporating a typical flash synchronization switching arrangement. The adapter includes a mounting and receiving element which serves to support the packaged linear flash array in a location elevated above the taking lens of the camera. So positioned, improved lighting effects are available for a significant number of typical snapshots. The adapter further includes a flash firing circuit which is coupled in operative relationship with the receiver and support and which is operative when activated and actuated to ignite the flashlamps in a predetermined sequence thereof from first to last. The adapter also includes means establishing an electrical power supply as well as a control circuit for effecting the energization of the firing circuit and for deriving a firing signal to carry out the ignition of a flashlamp. To accommodate for the select energy requirements of the firing circuit, the adapter utilizes one or more separate supplies of power, a first of these power supplies deriving requisite voltage levels for operating the electronic logic of a flash firing selector and a second of such power supplies being utilized to derive an electronic firing signal of predetermined electrical characteristics.

One embodiment of the invention provides for imposing the noted firing or igniting signal at the commencement of an exposure interval and causing the firing circuit to react to the firing signal in response to a general activation thereof which, in turn, is responsive to the actuation of a camera shutter synchronization switch. In another arrangement of the invention, a self-contained battery source of a camera is utilized to carry out electronic switching which, in turn, provides for the activation of a flash selector and igniting circuit.

Other objects of the invention will in part be obvious and will in part appear hereinafter.

The invention accordingly comprises the system and apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 2 is a pictoral representation of a typical automatic shutter showing conventional switches utilized therewithin;

FIG. 3 is a partial side view of the shutter mechanism of FIG. 2 showing flash igniting contact terminals;

FIG. 5 is a pictoral representation of a camera incorporating a prototype embodiment of the adapter arrangement of the invention;

FIG. 6 is a pictoral representation of a photographic camera showing another prototype design for the camera of the invention;

FIG. 7 is a partial view showing a portion of the adapter apparatus shown in FIG. 6;

FIG. 8 is another view of the adapter arrangement of FIG. 6;

FIG. 15 is a representation of a switching arrangement for utilizing the instant adapter apparatus in conjunction with a shutter of a variety operative to percussively ignite flashlamps; and FIG. 16 is another view of the switching arrangement of FIG. 15.

DETAILED DESCRIPTION

Figure 1:
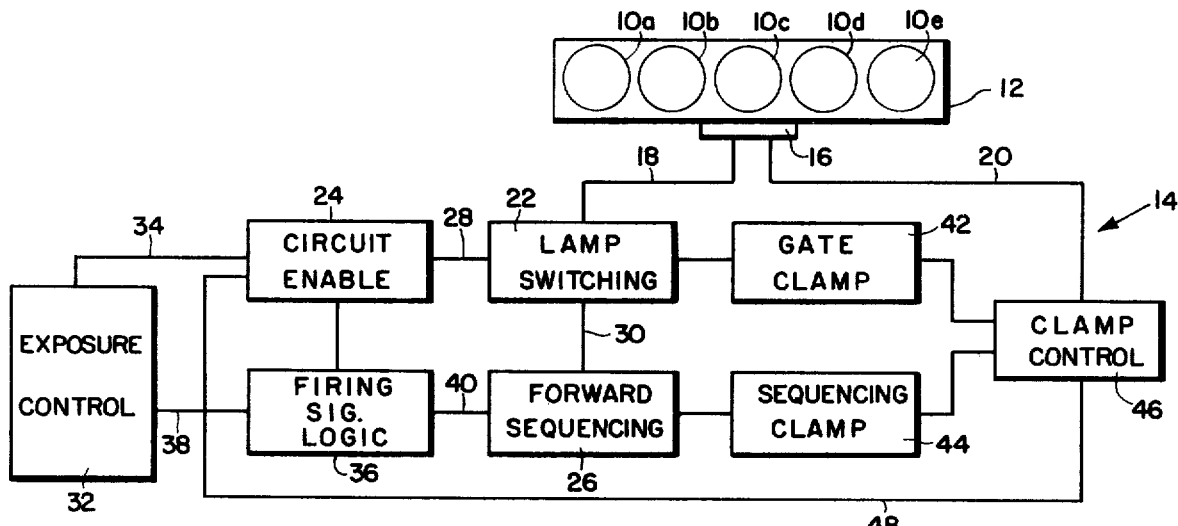
FIG. 1 is a block schematic diagram of a sequencing circuit which may be utilized in conjunction with the instant invention.

The adapter and control arrangement of the instant invention works in conjunction with a flash firing or sequencing circuit, the logic components of which are illustrated in FIG. 1. This circuit is described in detail in copending application for U.S. Pat., Ser. No. 321,993 filed Jan 8, 1973 by S. Ellin, entitled "Flashlamp Signaling Circuit Employing Logic Signal Activation", as well as in copending application for U.S. Pat., Ser. No. 333,331 filed Feb. 17, 1973 by J. P. Burgarella et al., entitled "Flash Photographic Control System", both applications being assigned in common herewith. As shown in FIG. 1, a linear array of flashlamps designated as 10a–10e are mounted in a disposable package 12 for connection to the overall sequencing and firing circuit depicted generally at 14—this array is illustrated in more detail later herein. The terminals of individual flashlamps 10a–10e within the array 12 are connected by printed circuit techniques to a downwardly extending blade mount 16, each side of which is configured to expose five input contacts and a common lead for selectively supplying igniting current to successive ones of the lamps. As noted earlier, the packaging structure of array 12 and mount 16 is described in U.S. Pat. Nos. 3,598,984 and 3,598,985.

Individual connections between the circuit 12 and contact terminals at blade 16 are made by discrete leads depicted only generally in FIG. 1 by lines 18 and 20. As generally designated by line 18, the inputs to individual lamps are interconnected with corresponding switching networks of a lamp switching subcircuit depicted by block 22. When the entire circuit 14 including lamp switching subcircuit 22 is activated or enabled as by a camera operational logic circuit enabling function 24, the individual switching networks within subcircuit 22 are aligned to carry out a predetermined sequence of switching by a forward sequencing network depicted by block 26. The respective functional inputs from circuits 24 and 26 are shown at lines 28 and 30.

To cause a synchronized firing of a flashlamp 10a–10e, the exposure control system of an included camera as depicted at 32 activates circuit enabling function 24 as through line 34 and then regulates the development of a firing signal through camera mounted firing signal logic elements as are represented at block 36. The command to develop such firing signals is presented along line 38. This signal is then introduced along line 40 to forward sequencing circuit 26 which, in turn, activates lamp switching subcircuit 22.

Either of two forms of firing signal are generated at block 36. In one arrangement, an inductively derived higher voltage "spike" of very short duration is generated for flash firing purposes. In another arrangement, a logic level signal is derived, for instance one which may be evolved through simple switching or the like.

As a particular lamp switch network within subcircuit 22 is actuated to carry out the firing of a selected flashlamp 10a–10e, the lamp switching circuit 22 and forward sequencing function 26 are clamped or isolated by means of gate clamp circuits, generally designated at 42, and a sequencing clamp, designated at 44, so as to prevent accidental further firing of flashlamps 10a–10e until a subsequent exposure control signal is received. This clamping function is initiated by a clamp control designated at 46 which is coupled between the lamp array 12 as functionally shown by line 20 and the circuit enabling function 24 as indicated by line 48. In this arrangement, the clamp control 46 is self-latching so that once rendered operative to isolate the lamp switching function 22 and the forward sequencing function 26 responsive to firing of a given flashlamp, these functions 22 and 26 cannot again be operated until the clamp control is deactivated. This deactivation is carried out through exposure control function 32.

Another feature of clamp control 46 resides in the derivation of a "high" output condition in response to the successful firing of a flashlamp 10a–10e. This output may be utilized as a logic signal for ensuing photographic cycle control purposes.

Except for the lamp array 12 and exposure control function 32, the circuit 14 is generally constructed in a unitary chip as a monolithic or hybred integrated circuit which utilizes all the advantages of size, cost and reliability conventionally associated with solid state, large scale integration.

To operate circuit 14 in conjunction with conventional shutter devices requires accommodation to the typical operating characteristics thereof. Referring to FIG. 2, a typical shutter utilized in conjunction with a popularly priced photographic camera is represented generally at 54. This shutter is described in detail in U.S. Pat. No. 3,589,254, accordingly, only the salient features thereof pertinent to the instant discussion are identified.

Shutter 54 incorporates a capping blade 56, an opening blade 58 and a closing blade 60. These blades are pivotally mounted upon an upstanding stud 62 extending from a rear support portion 64 of the shutter assembly. To define an interval of exposure, a manually actuated push rod (not shown) rotates capping blade 56 from a point of contact at 66 until such time as the exposure aperture of the assembly is cleared. At about this orientation, a latching arrangement (not shown) releases opening blade 58 while an electromagnetic assembly as at 66 retains closing blade 60 in the orientation shown in consequence of its energization.

As opening blade 58 reaches a fully opened position, a tab 68 extending upwardly therefrom strikes one resilient contact member 70 of a synchronization switch $S_2$ to generate a flash firing signal. It may be noted that switch $S_2$ is configured to be actuated in a manner wherein it remains closed throughout an interval of exposure. The switch will not open until an exposure interval is terminated. Following an appropriate time-out by a control circuit depicted generally at 74, electromagnetic assembly 66 releases closing blade 60 for spring biased movement upwardly to terminate an exposure. Spring arrangements at stud 62 then return the assembly to its initial starting point.

Energization of the control circuit as well as electromagnetic assembly 66 at the commencement of a photographic cycle takes place in consequence of the release of a switching latch 76 by the earlier described push rod (not shown). As rod 76 is released, a spring 78 permits a cam surface thereupon to lower leaf 80 of a switch designated $S_1$ into contact with an opposite terminal positioned upon support 64. With such closure, a self-contained battery source within the camera carrying the shutter provides power for flash firing as well as exposure regulation.

Shutter 54 also contains a flashcube mounting structure shown generally at 80. Also described in the noted U.S. Pat. No. 3,589,254, assembly 80 includes an indexing drive mechanism including rod 82 and eccentric 84 which reacts to movement of blades 56–60 to release a flashcube supporting portion 86 for movement under spring drive. This supporting structure is additionally illustrated in FIG. 3. Note in the latter figure that structure 86 includes contact terminals 88 and 90 intended for circuit completing contact with the appropriate leads of a properly oriented flashlamp within a mounted flashcube. Assembly 86 further includes a small actuating rod 92 which is depressed by the inner post of a flashcube upon its being appropriately mounted. A flashcube is retained inwardly upon mount 86 by a bifurcated post 94 which slides within the hollow post of a flashcube and grips the post internally thereof.

Returning momentarily to FIG. 2, it may be seen that depression of rod 92 will cause its inwardly extending end 96 to move a resilient leaf 98 of a switch shown generally at $S_3$ into contact with an adjacent leaf 102. Switch $S_3$ serves to cause control circuit 74 to operate in a flash mode of fixed exposure interval.

Figure 4:
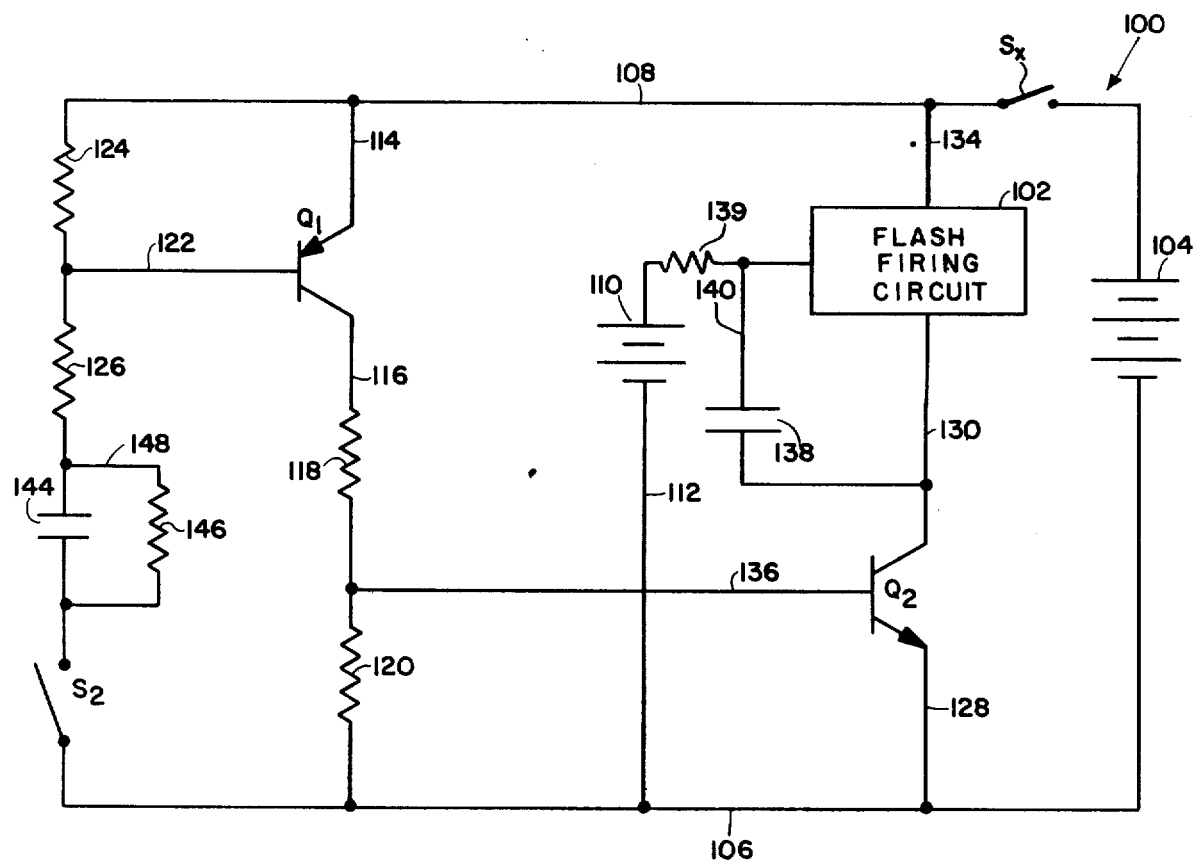
FIG. 4 is a circuit diagram showing one control embodiment of the invention.

Looking to FIG. 4, a control circuit arrangement which is characterized by its utilization with a synchronization switch as described at $S_2$ in FIG. 2 is represented generally at 100. It may be recalled that switch $S_2$ is closed to cause the firing of a flashlamp and remains closed substantially throughout the remainder of an exposure cycle. Another characteristic of control circuit 100 resides in its ability to simulate a high voltage electrical firing signal to carry out the actuation of a flash firing circuit as is represented functionally within the drawing by block 102 labeled "Flash Firing Circuit". Block 102 has been described at 14 in FIG. 1.

Circuit 100 utilizes an initial battery power supply 104 for purposes of general circuit activation. Accordingly, battery 104 is connected through power leads 106 and 108 which, in turn, are activated with the closure of switch $S_2$. The predetermined output rating of battery 104 may, for instance, be selected at 6 volts in keeping with the requirements for flash firing sequencing circuit 102. However, to fire circuit 102, it is necessary to develop a voltage differential above that voltage value developed by activating battery 104. This is accomplished by continuously imposing another battery derived higher voltage, for instance 15 volts from battery 110. Battery 110 is connected within line 112 between power lead 106 and the input to sequencing or flash firing circuit 102. Accordingly, at such time as circuit 102 is activated and timing conditions are met, a flashlamp may be fired thereby. A power switch, designated $S_r$, is inserted within line 108 to eliminate battery drain during periods of non-use of the circuit.

Activation takes place in conjunction with the operation of a PNP transistor $Q_1$ of a timing network and an NPN drive transistor $Q_2$. The emitter of transistor $Q_1$ is connected along line 114 to power lead 108, while its collector is connected through line 116 as well as divider or level setting resistors 118 and 120 to lead 106. The base of transistor $Q_1$ is coupled along line 122 to line 108 at a point intermediate a hold-off resistor 124 and current limiting resistor 126.

The emitter of drive transistor $Q_2$ is connected through line 128 to lead 106, while its collector is coupled through line 130 to one activating input of firing circuit 102. An opposite activating input lead to circuit 102 extends through line 134 from power lead 108. The base of transistor $Q_2$ is connected along line 136 to line 116 at a point intermediate resistors 118 and 120. Thus interconnected, with closure of switch $S_2$, transistor $Q_1$ is drawn into conduction to, in turn, assert a forward bias across the base emitter junction of transistor $Q_2$. Flash firing or sequencing circuit 102 is activated; however, the firing signal present at line 112 from battery 110 is not asserted. To account for any bounce at switch $S_2$, a short delay, for instance, four milliseconds, is asserted in consequence of the presence of a small timing capacitor 138 coupled within line 140 to the input of circuit 102 at line 112 and the collector side of transistor $Q_2$ at line 130. Additionally, a current limiting resistor 139 is provided in line 112 intermediate battery 110 and line 140 to provide an R-C time constant arrangement with capacitor 138. With this design, the requisite voltage level for actuating circuit 102 is not presented until such time as capacitor 138 has been charged. When this charge has occurred, a flashlamp will be fired from circuit 102.

Transistor $Q_1$ remains forward biased until such time as a capacitor 144, positioned above switch $S_2$, is charged. At such time as this charging is complete, for instance about 40 milliseconds, transistor $Q_1$ is turned off to, in turn, remove the forward bias at transistor $Q_2$. A resistor 146 within line 148 is coupled across capacitor 144 for purposes of discharging it at the opening of $S_2$ and termination of an exposure cycle.

FIG. 5 reveals an experimental assembly for an adapter wherein the control arrangement of the invention is mounted upon a currently manufactured snapshot format camera. Looking to the figure, this snapshot camera is depicted generally at 150 to include a housing structure having a photographic film retaining chamber 152 from which depends a housing extension 154 and an exposure control housing 156. The latter exposure control housing includes a push rod or the like 158 which is manually depressed to carry out a photographic cycle, a taking lens, appropriately mounted within a supportive bezel as at 160, and an externally depending flashcube mount, a portion of which is shown at 162.

Housing 156 preferably is designed to utilize the flashcube mounting, indexing and shutter assembly as described in FIGS. 2 and 3. Chamber 152 also supports an elongate, rectangularly shaped viewfinder 164 along its upward edge. Viewfinder 164 is formed such that it tapers from the rear of camera 150 to define progressively increasing rectangular cross-sectional profiles toward the entrance optics thereof. In the experimental adapter arrangement illustrated, a mount as at 166 was fabricated having an internally channeled portion dimensioned to slide over viewfinder 164 from the rearward end thereof and latch into place in the orientation shown. Mount 166 includes an elongate socket 168 dimensioned to receive the mounting blade of a linear flash array. Also positioned upon mount 166 is flash firing or sequencing circuit 40 in integrated or chip form as well as straps as at 170 and 172 dimensioned to support two battery supplies shown, respectively, at 174 and 176.

Batteries 174 and 176 correspond, for instance, to batteries 104 and 110 as described in connection with FIG. 4. Appropriate leads generally depicted at 178 extend from batteries 176 and 174 as well as the integrated flash firing circuit on mount 166 to a modified flashcube assembly shown at 180.

The flashlamps from cubic package 180 are removed and a control circuit such as described in connection with FIG. 4 is mounted therewithin. Through the simple expedient of mounting cube 180 within receiving socket 162, camera 150 is caused to operate in the flash mode and the adapter arrangement permits the use of a linear packaged flash array as shown at 182. Note that flash assembly 182 includes five flashlamps facing to illuminate a scene as well as a mounting bar 184 having lamp output terminals printed thereupon. Bar 184 is of standardized design and fits and supports the array 182 from socket 168.

As is described in the noted U.S. Pat. No. 3,589,254, the shutter mechanism as at 54 of exposure housing 156 will operate satisfactorily even though cube package 180 is held stationary during an exposure cycle. This arrangement is available through a simple override design of the shutter assembly. Should such override not be available, the lugs extending outwardly from the flashcube post may be removed.

An improved version of the experimental embodiment of FIG. 5 is revealed in FIG. 6. Here, camera 156 is reproduced, the components thereof being identified with the same numeration as shown in FIG. 5. In this embodiment, the mounting fixture 190 for receiving and supporting flash array 182 is configured to be slidably mounted over viewfinder housing 164 and, additionally, supports receiving socket 192 as well as an integrated chip version of a flash firing and sequencing circuit. However, the control circuit, for instance a circuit similar to that shown at 100 in FIG. 4, as well as both battery power supplies are contained within a rectangularly shaped adapter housing 194. Electrical interconnection between socket 192 and the sequencing or flash firing circuit at fixture 190 is provided by a lead cable 196 extending to housing 194. Housing 194 is configured having an inwardly extending post (not shown) of identical structure as that extending from a flashcube. This post mounts within flashcube mount 162 and serves to secure housing 194 against the housing of camera 150. Housing 194 is of a length selected such that its rearward surface 198 abuts against the corresponding forward surface of chamber 152. Thus configured, housing 194 is readily retained in the position shown in the figure.

The simple features of mounting fixture 190 and adapter housing 194 are further revealed in FIGS. 7 and 8. Note that a spring clip 200 is provided on the lower portion of mounting fixture 190 for removably securing it upon viewfinder 164. As noted earlier, where a shutter contains no override feature, the lugs as at 202 in FIG. 7 may be removed to permit the flashcube indexing apparatus to rotate in normal fashion.

The elevated positioning of flash array 182 in the embodiment shown in FIGS. 5 and 6 provides for photographic advantage in recording images of human subjects. For instance, should the flash array be positioned too close to the mean axis of taking lens 160, an undesirable effect described as "red eye" may be witnessed. Additionally, the elevated location of the artificial light source tends to minimize any grotesque shadowing or the like in a resultant human image.

Figure 9:
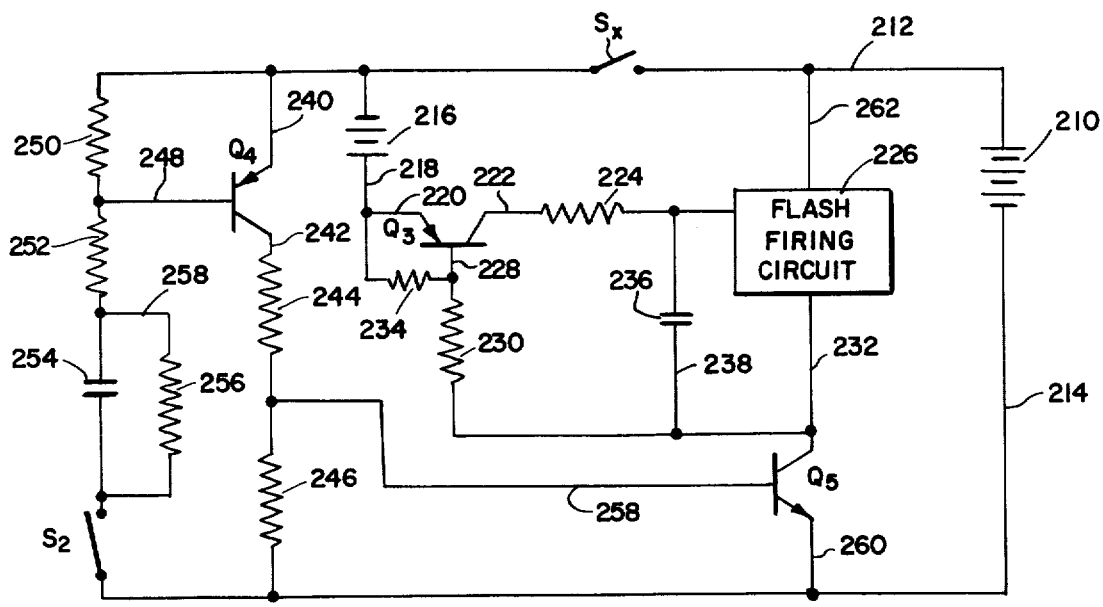
FIG. 9 is another embodiment of the control arrangement of the invention.

A variation of the circuit of FIG. 4 is revealed in FIG. 9. In that figure, circuit activating battery 210 is connected, as before, between power leads 212 and 214 which extend to synchronizing switch $S_2$. Again, switch $S_2$ is one normally remaining closed following flash ignition or one which is closed for a significant period of time during an exposure cycle, for instance about 50 milliseconds. A requisite electrical driving signal is generated from a second battery 216 connected within line 218 to power lead 212. Line 218, in turn, is connected through line 220 to the emitter side of a PNP transistor $Q_3$. The collector of transistor $Q_3$ is connected by line 222 through resistor 224 to the firing input terminal of flash firing circuit 226. The base of transistor $Q_3$ is connected by line 228 and resistor 230 to flash firing energizing line 232. The base is also connected from line 228 through resistor 234 to line 218. As in FIG. 4, a power switch $S_x$ is inserted within lead 212 to prohibit battery drain during periods of non-use of the circuit.

With the arrangement shown, when transistor $Q_3$ is turned on or forward biased, a flash firing signal of appropriate voltage value may be generated from the cumulative voltage signal developed at line 224 from batteries 216 and 210. Note that the polar orientation of battery 216 is reversed from the battery configuration of FIG. 4. As in the embodiment of FIG. 4, a capacitor 236 connected in line 238 between lines 222 and 228 provides a short delay in the generation of an appropriate triggering voltage in correspondence with the time factor involved in assuring the termination of bounce at switch $S_2$.

Drive for the activation of circuit 226 is derived, as before, through the forward biasing of PNP transistor $Q_4$ and NPN transistor $Q_5$. The emitter of transistor $Q_4$ is connected along line 240 to power lead 212, while its collector is connected to line 242 through bias or level setting resistors 244 and 246 to power lead 214. The base of transistor $Q_4$ is connected through line 248 to line 212 at a point intermediate hold-off resistor 250 and resistor 252. An activation time-out for the circuit is provided by timing capacitor 254 which operates in conjunction with a discharge resistor 256 coupled thereacross by line 258.

As in the embodiment of FIG. 4, as transistor $Q_4$ is forward biased, a corresponding forward bias is derived at transistor $Q_5$. Note in this regard, that the base of transistor $Q_5$ is coupled intermediate resistors 244 and 246 between line 242 from line 258, while its emitter is connected through line 260 to power lead 214. The collector of transistor $Q_5$ is coupled to firing circuit activating line 232, while the opposite activating line to circuit 226 is provided from line 212 through line 262.

With the arrangement shown, transistor $Q_4$ is forward biased at the initial closure of switch $S_2$ and remains forward biased until such time as capacitor 254 reaches a predetermined charge level. As transistor $Q_5$ correspondingly is forward biased, circuit 226 is activated and will fire a selected flashlamp following a short delay as required to charge capacitor 236 from line 222 and forwardly bias transistor $Q_3$. Note that the control arrangement of FIG. 9 provides for predetermined limited energization or activation of firing circuit 226 and, additionally, provides a synchronization switch bounce time-out feature.

Figure 10:
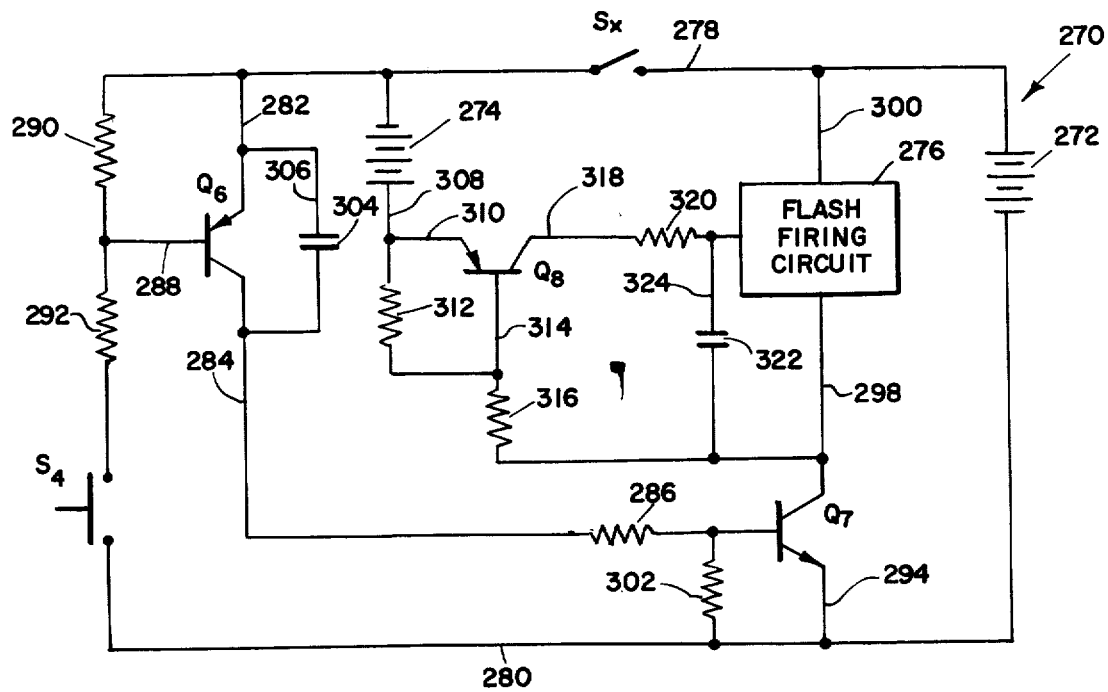
FIGS. 10, 11 and 12 are circuit diagrams showing other embodiments of the control arrangement of the invention.

Looking to FIG. 10, another control circuit embodiment is revealed generally at 270. Control arrangement 270 is intended for use with shutter mechanisms utilizing a synchronization switch, here identified as $S_4$, which is closed for a relatively short duration to provide a flash firing signal. The circuit utilizes dual battery supplies as at 272 and 274 in the same manner as shown in FIG. 9 for purposes of generating a firing signal of appropriate voltage level. Activating current for flash firing circuit 276 is provided from battery 272 through power leads 278 and 280 which, in turn, extend to switch $S_4$. Again, a switch $S_x$ is present in lead 278 for purposes of eliminating battery drain during periods of non-use of the circuit. With the momentary closure of switch $S_4$, PNP transistor $Q_6$ will be drawn into a forward biased condition. The collector of transistor $Q_6$ is connected through line 282 to lead 278, while its collector is coupled along line 284 through bias resistor 286 to the base of NPN transistor $Q_7$. The base of transistor $Q_6$ is connected along line 288 to line 278 at a point intermediate hold-off and base drive limiting resistors 290 and 292.

The emitter of transistor $Q_7$ is connected through line 294 to lead 280, while its collector is connected through activating line 298 to the activating input terminal of circuit 276. The opposite side of circuit 276 is coupled to lead 278 through line 300. A resistor 302 is inserted between line 284 and line 280 at the base of transistor $Q_7$ and serves as a steady state hold-off resistor.

With the arrangement shown, at the momentary closure of the contact of switch $S_4$, transistor $Q_6$ is drawn into a forward biased state to activate lines 282 and 284. A timing capacitor 304, connected across the emitter and collector of transistor $Q_6$ is discharged by transistor $Q_6$. Transistor $Q_7$ is also turned on via current flow through resistor 286. Transistor $Q_6$ turns off when switch $S_4$ opens; however, transistor $Q_7$ remains on as capacitor 304 charges. Transistor $Q_7$ turns off when capacitor 304 is nearly charged. As in the embodiment of FIG. 9, firing signal battery 274 is connected within line 308 to power lead 278, line 308, in turn, being coupled through line 310 to the emitter of PNP transistor $Q_8$. The opposite side of line 308 extends through hold-off resistor 312 to line 314 which, in turn, is coupled with the base of transistor $Q_8$. Line 314 extends from the base of transistor $Q_8$ through bias resistor 316 through activating line 298. The collector of transistor $Q_8$ extends through line 318 and resistor 320 to the firing input terminal of flash firing circuit 276. A short interval firing delay is provided by capacitor 322 coupled within line 324 between the firing input at line 318 of circuit 276 and line 314. Accordingly, switch bounce characteristics which may be evidenced at switch $S_4$ are accommodated for within the circuit through the imposition of a select firing delay determined in accordance with the time constant of the network including capacitor 322 and resistor 320.

Figure 11:
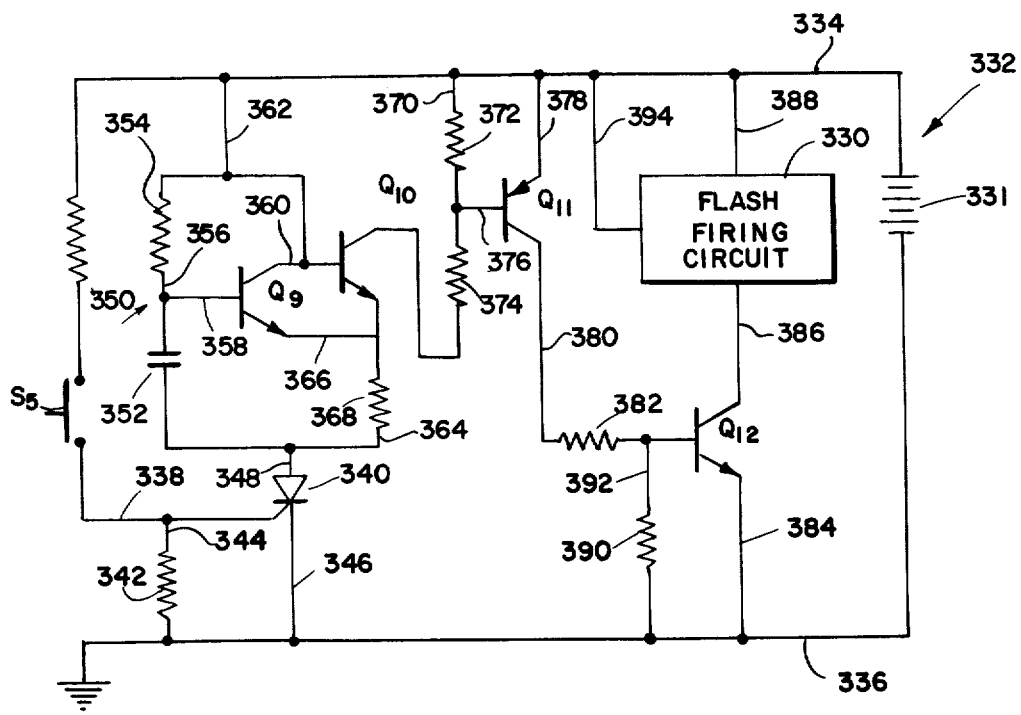

Turning to FIG. 11, a control circuit arrangement functioning with a flash firing circuit 330 which is operative to fire a flashlamp in receipt of a logic level firing signal is shown generally at 332. Inasmuch as only a voltage level change is required to develop a firing signal for circuit 330, a singular activating battery 331 is present within the circuit connected between lines 334 and 336. Synchronization switch $S_5$, connected between power lead 334 and line 338 also is one operating to derive either a momentary or extended closure of its contact to evolve a flashlamp firing signal. Circuit 332 accommodates for this closure by detecting the first discrete closure of the contacts of switch $S_5$, following which the activating or energizing components thereof are clamped. As a result, further bounce effects encountered at switch $S_5$ have no effect upon the operation of the circuit.

Detection of the initial closure of the contacts of switch $S_5$ is made by a gated silicon control rectifier (SCR) 340. SCR 340 may be rendered conducting (assuming the anode is positively biased) in accordance with an appropriate bias or signal and, in response to the receipt of such signal, is self-latching as long as the anode voltage thereof remains positive with respect to its cathode. With the connection shown, the gate of SCR 340 is connected with switch $S_5$ through line 338. A hold-off resistor 342 within line 344 connects line 338 with power lead 336. The cathode of SCR 340 is connected along line 346 to ground power lead 336, while its anode is coupled through line 348 to a timing network designated generally at 350. Serving to control the extent of time period of energization of circuit 330, timing network 350 is formed containing an R-C timing sub-network including timing capacitor 352 and resistor 354 coupled within line 356. A Schmitt-type trigger including NPN transistors $Q_9$ and $Q_{10}$ is connected within network 350 to monitor and react to the attainment of a predetermined threshold voltage value of the sub-network as it is achieved at line 358. Line 358 is coupled between line 356 and the base of transistor $Q_9$, while the collector thereof is connected along line 360 to the base of transistor $Q_{10}$. Line 360, in turn, is coupled through line 356 and line 362 to power lead 334. The emitters of transistors $Q_9$ and $Q_{10}$ are commonly coupled through lines 364 and 366 through resistor 368 to line 348 at the anode side of SCR 340.

With the arrangement shown, as SCR 340 is gated into conduction, transistor $Q_{10}$ is forward biased, while transistor $Q_9$ remains off. When forwardly biased, transistor $Q_{10}$ completes the circuit path from line 334, line 370 including resistors 372 and 374, thence to conducting SCR 340 and to line 336. As a consequence of this circuit completion, PNP transistor $Q_{11}$ is drawn on. The base of transistor $Q_{11}$ is connected intermediate resistors 372 and 374 through line 376, its emitter is coupled through line 378 to lead 334 and its collector is coupled through line 380 and bias resistor 382 to the base of NPN transistor $Q_{12}$. Serving as a drive transistor for circuit 330, the emitter of transistor $Q_{12}$ is coupled to lead 336 through line 384, while its collector is connected through line 386 to the activating input of circuit 330. The opposite activating input to circuit 330 derives from line 334 as it is coupled with line 388. A hold-off resistor 390 is coupled between the base of transistor $Q_{12}$ and line 336.

A flash firing logic level signal is continually introduced to circuit 330 from along lines 334 and 394. Accordingly, upon the forward biasing of transistor $Q_{12}$, circuit 330 carries out the firing of a flashlamp. No timing arrangement for accommodating the bounce characteristics at synchronizing switch $S_5$ is present in the instant circuit inasmuch as the drive functions thereof are clamped at SCR 340 at the first identifiable switch activation.

Following an appropriate time-out at timing network 350, a predetermined threshold value voltage will appear at line 358. As a consequence, transistor $Q_9$ turns "on" to, in turn, remove the forward bias at transistor $Q_{10}$. The current flow in line 370 is halted and transistors $Q_{11}$ and $Q_{12}$ are turned off. Termination of current flow in line 370 also serves to reduce anode current to SCR 340 to permit the circuit to shut down pending the initiation of another photographic cycle. The utilization of a timing network such as that shown at 350 in circuit 332 affords advantage in miniaturization. In particular, the size of capacitor 352 advantageously may be reduced.

Figure 12:
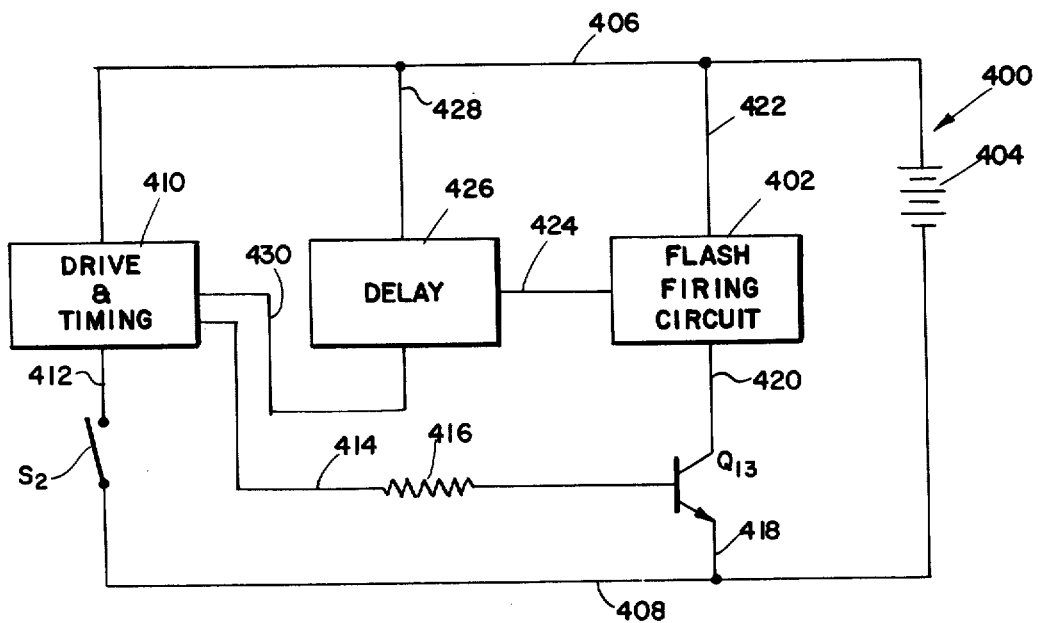

FIG. 12 shows, in more schematic fashion, a variation of the circuit of FIG. 11 wherein initial switch closure is not detected; however, the circuit utilizes a logic level signal and operates in conjunction with a switch as described earlier at $S_2$. This switch remains closed following actuation thereof for a substantial portion of a photographic exposure cycle. Depicted generally at 400, the circuit of this embodiment includes a flash firing circuit 402 which is activated from singular battery 404. Battery 404 is connected with the circuit through power leads 406 and 408.

The drive and timing components of circuit 400 are represented functionally by block 410. These components have been described in connection with FIG. 11 at network 350 and in conjunction with the operation of transistor $Q_{11}$. Function 410 is coupled with power lead 406 and with switch $S_2$ through line 412. Accordingly, with the closure of switch $S_2$, NPN transistor $Q_{13}$ is forward biased from line 414 and bias resistor 416 connected with the base thereof. The emitter of transistor $Q_{13}$ is coupled through line 418 to lead 408, while its collector is coupled through activating line 420 to circuit 402. The opposite or corresponding activating input to circuit 402 is provided from lead 406 through line 422. A logic level firing signal is generated at the firing signal input line 424 of circuit 402 following a select delay thereof as derived at delay function block 426. Delay 426 may be derived in similar fashion as described in connection with capacitor 138 of FIG. 4 or capacitor 236 of FIG. 9. Delay 426 is energized from line 406 through line 428 and is activated through functional connection with drive and timing function 410 as depicted by line 430.

Figure 13:
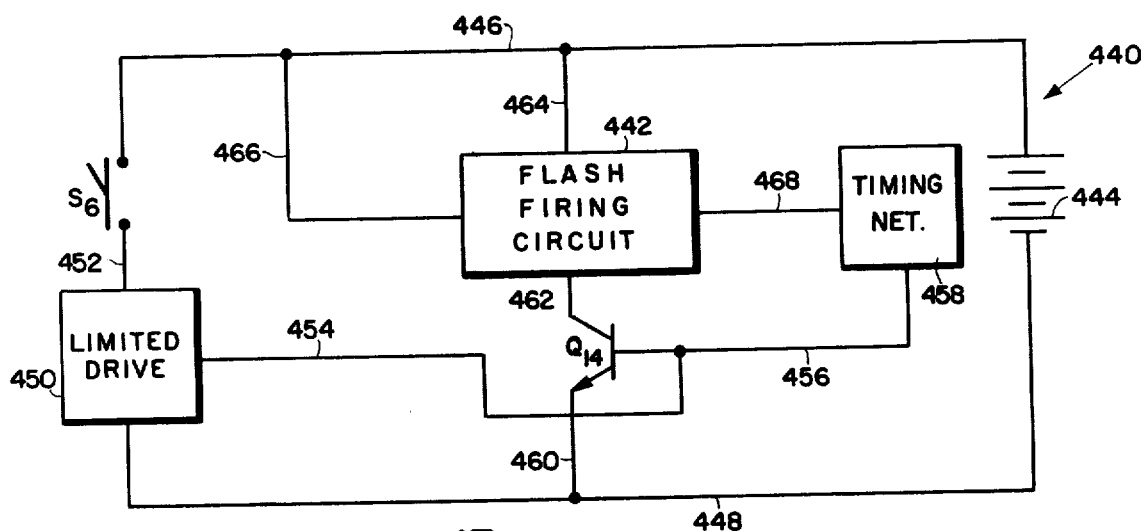
FIG. 13 is a schematic diagram showing a circuit technique for the control arrangement of the invention.

Looking to FIG. 13, an embodiment utilizing the high voltage value output from clamp control function 46 of FIG. 1 to effect circuit energization time-out is illustrated generally at 440. Operating from a logic level firing signal, flash firing circuit 442 utilizes a singular battery activating source at 444. The positive side of battery 444 is connected through lead 446 to one side of shutter synchronization switch $S_6$. Switch $S_6$ may be one of a variety which is only momentarily closed to effect flashlamp ignition. The opposite side of battery 444 is coupled through power lead 448 to a limited drive function depicted generally at 450. Limited drive 450, in turn, is coupled through line 452 to the opposite contact terminal of switch S₆. Limited drive 450 serves to generate a voltage signal at line 454 for an interval sufficient to forward bias the base emitter junction of NPN transistor $Q_{14}$ to, in turn, activate circuit 442. Note in this regard that line 454 is connected to line 456 which is coupled between a timing network 458 and the base of transistor $Q_{14}$. The emitter of transistor $Q_{14}$ is coupled through line 460 to line 448, while its collector is coupled through line 462 to one energizing input of circuit 442. The opposite energizing input to circuit 442 is provided by line 464 which is coupled with power lead 446.

As transistor $Q_{14}$ is forward biased, flash firing circuit 442 is activated and, simultaneously, a logic level firing signal is imposed from line 446 through line 466 to the firing input of circuit 442. This causes circuit 442 to ignite a flashlamp and, in turn, its clamping control feature derives a responsive high value signal at output line 468. Timing network 458 responds to this high output signal to maintain the forward bias at transistor $Q_{14}$ from line 456. Once such bias is assured, limited drive 450 discontinues the energization of line 454. Following an appropriate energization time-out, timing network 458 terminates the forward bias at transistor $Q_{14}$ to shut down the circuit.

Figure 14:
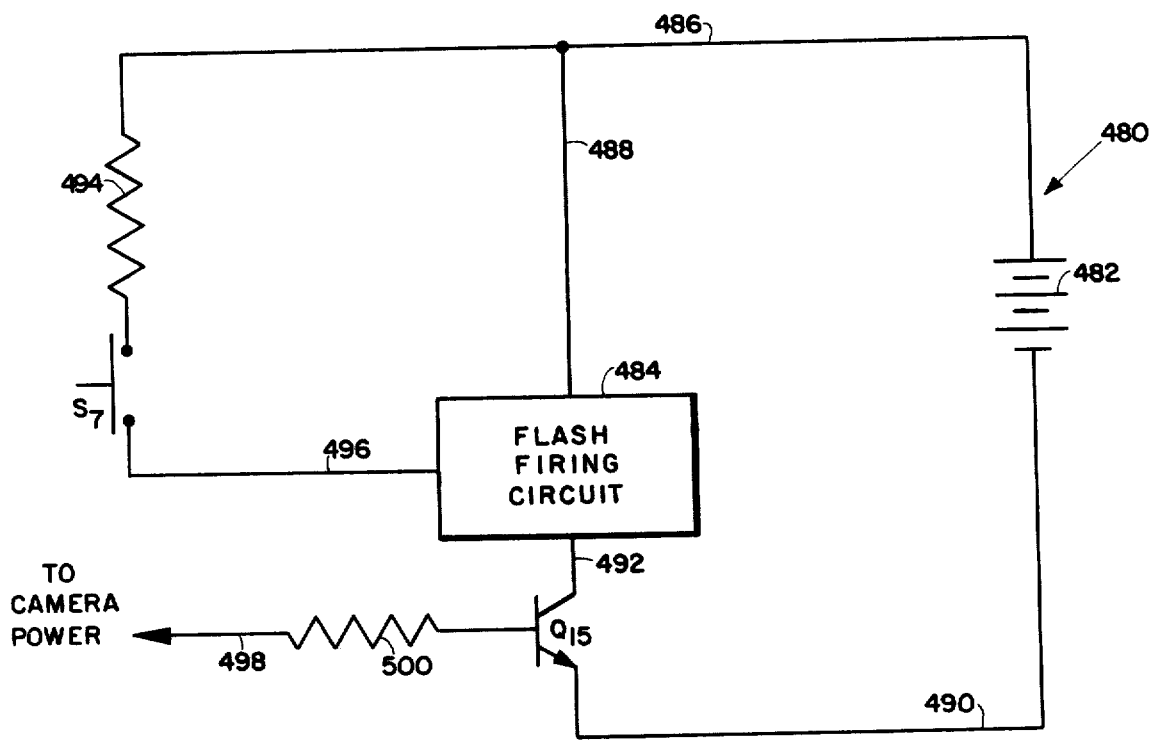
FIG. 14 shows a schematic circuit diagram representing still another embodiment of the control arrangement of the invention.

Looking to FIG. 14, a circuit arrangement shown generally at 480 is presented which utilizes the self-contained power of a camera mounted battery power supply to carry out drive switching, while utilizing the predetermined voltage or power levels of a battery 482 to derive requisite energization or activation of flash firing circuit 484. This separate activation of circuit 484 advantageously provides an inherent immunity of circuit 484 from any bounce occasioned at a synchronization switch such as that depicted at S₇. Activating power for circuit 484 derives from battery 482 from along power lead 486 and line 488. The opposite activating input to circuit 484 derives from power lead 490, NPN transistor $Q_{15}$ whose emitter is connected therewith and line 492 connected between circuit 484 and the collector of transistor $Q_{15}$. Synchronization switch S₇ is connected directly to power lead 486 through current limiting resistor 494 and to the flash firing input of circuit 484 through line 492.

Looking momentarily to FIG. 2, the self-contained battery power supply from a camera utilizing a shutter shown in that figure may be derived by tapping the contacts of switch S₁. Recall that this switch is closed at the commencement of an exposure cycle and remains closed for a sufficient interval following depression of start pushrod 158 to carry out the requisite drive function for circuit 480.

Returning to FIG. 14, the base of transistor $Q_{15}$ is shown coupled through line 498 and bias resistor 500 to the noted camera power supply. This supply need not be at the requisite control voltage derived at battery 482 and remains available for an interval of sufficient length to permit circuit 484 to carry out a sequencing and firing operation. Switch bounce encountered at synchronization switch S₇ will not effect the operation of circuit 484 inasmuch as the circuit will not fire an additional flashlamp in the presence of a logic signal at line 496 until such time as it has been de-energized. Inasmuch as energization of circuit 484 continues from the separate forward biasing of transistor $Q_{15}$, no such de-energization may take place until the bias supply from line 498 is removed. This particular shutdown feature of circuit 484 has been described earlier in connection with FIG. 1.

The adapter arrangement of the invention also can be utilized in conjunction with cameras designed to fire percussively ignited flashcubes. The design of such flashcubes also is internationally standardized. Generally, however, they are formed as a cubic package having four flashlamps therewithin, each such lamp being formed as a glass envelope within which is contained the usual shredded, ignitable zirconium foil or an equivalent substitute. Communicating with the foil through the glass envelope is a hollow deformable base which contains a percussive material. By striking and deforming the base with a spring loaded firing pin, the percussive material thermally reacts and particles therefrom are caused to travel upwardly through the base and ignite the shredded foil. The firing pin is resiliently preloaded against a restraining element during fabrication of the flashcube.

Designs for mounting and percussively igniting such flashcubes abound in the art. In each, however, a firing probe or the like is driven by a shutter mechanism into the noted flashcube firing pin to effect ignition. To utilize the adapter arrangement of the instant invention with such a flash firing technique, an adaptive device providing for switch actuation in response to movement of the firing probe is required and such a device is shown in FIGS. 15 and 16. A typical mount upon which the instant switching adapter may be utilized is described in U.S. Pat. Nos. 3,640,194 and 3,687,034. Looking to FIG. 15, an upwardly extending portion of a percussive flashcube mount is shown at 480. A switching adapter 482 is shown mounted thereover having a profile somewhat corresponding with the top face of mount 480. Adapter 482 is formed having resilient switch contact leaves 484 and 486 which are oriented to be normally out of mutual contact. A simple dual lead cable 48 extends from each resilient leaf 484 and 486 to provide appropriate switching information to a control circuit of a variety operative in conjunction with synchronization switches of a variety which close only momentarily.

When appropriately positioned upon mount 480, adapter 482 positions switch leaf 486 over a firing probe as shown at 490. Accordingly, with the actuation of a shutter, probe 490 is driven upwardly to force leaf 486 into contact with leaf 484 to provide an electrical counterpart to the mechanical movement of firing probe 490. Looking to FIG. 16, adapter 482 is shown to be configured having a standardized flashcube mounting post extending downwardly therefrom as at 492. Additionally, the adapter is formed having a downward extending tab 494 which prevents rotation thereof from post 492 following each shutter actuation. The adapter further contains an opening as at 496 through which probe 490 is moved to effect switch actuation. For the embodiment shown, a form of shutter mechanism which incorporates an override capability as described earlier is required. Such a shutter arrangement is described in the aforementioned U.S. Patents. The form of adapter described as at 482 may be utilized in conjunction with control circuits as described in connection with FIGS. 10, 11 and 13.

Since certain changes may be made in the above apparatus and system without departing from the scope of the invention herein involved, it is intended that all matter contained in the above description or shown in

I claim:

1. An adapter for mountably receiving a packaged linear flashlamp array having a plurality of discrete igniting signal input contact surfaces, said adapter being operative in association with photographic apparatus of a variety including a housing, a taking lens mounted thereon, mounting means for supporting non-linear flash means, said mounting means including igniting output terminals connectable in igniting relationship with said flash means, and a shutter mechanism having a synchronization switch actuable in response to shutter actuation to effect an ignition of said flash means from said output terminals, said adapter comprising:

means mountable upon said housing for receiving and supporting said packaged linear flash array and including contact means discretely connectable in circuit completing relationship with select ones of said contact surfaces;

a flash firing circuit coupled in operative relationship with said receiving and supporting means, said circuit having an actuating input and further having an activating input for selective energization from a power supply and being operative in the presence of said selective energization to ignite said flashlamps within said array through said contact means in response to receipt at said actuating input of a firing signal of predetermined voltage characteristic;

means for establishing said electrical power supply when connected to a battery source; and control means coupled with said activating input, said actuating input, said power supply means and said synchronization switch, for effecting the said energization of said firing circuit and for deriving said firing signal at said actuating input in response to said actuation of said synchronization switch.

2. The adapter of claim 1 in which said control means includes firing delay means for delaying the introduction of said firing signal a predetermined period of time and in response to said synchronization switch actuation.

3. The adapter of claim 2 in which said firing delay means predetermined period of time is selected in correspondence with a period of time for assuring the discontinuance of any bounce characteristic evidenced by said synchronization switch.

4. The adapter of claim 1 in which said control means includes energization timing means for limiting the extent of said energization of said flash firing circuit for a predetermined period of time.

5. The adapter of claim 4 in which said predetermined period of time is selected in correspondence with the interval of time required for said control means to respond to said synchronization switch actuation and to effect said flash firing circuit ignition of a said flashlamp.

6. The adapter of claim 4 in which said control means includes firing delay means for delaying the introduction of said firing signal a predetermined period of time and in response to said synchronization switch actuation.

7. The adapter of claim 1 in which said mountable means is configured for removable support upon said housing in a position wherein said packaged flashlamps of said array are located at positions above said taking lens.

8. The adapter of claim 1 in which:
   said means establishing an electrical power supply includes means deriving a power supply of first voltage value, and means deriving a power supply of second voltage value; and
   said control means is configured for energizing said flash firing circuit at said activating input from said power supply of first voltage value, and for generating said firing signal utilizing said second voltage value.

9. The adapter of claim 1 in which said control means is operative to continually assert said predetermined voltage characteristic at said actuating input and to effect a said firing circuit ignition of a select said flashlamp upon energization of said firing circuit in response to said synchronization switch actuation.

10. The adapter of claim 9 in which said control means includes firing delay means for delaying the introduction of said firing signal a predetermined period of time and in response to said synchronization switch actuation.

11. The adapter of claim 9 in which said control means includes energization timing means for limiting the extent of said energization of said flash firing circuit to a predetermined period of time.

12. The adapter of claim 11 in which said control means includes firing delay means for delaying the introduction of said firing signal a predetermined period of time and in response to said synchronization switch actuation.

13. The adapter of claim 1 in which said control means comprises:
   drive means for energizing said flash firing circuit when activated;
   detector means responsive to said synchronizing switch actuation for clamping said drive means in a condition of said activation; and
   timing means for de-activating said drive means and said detector means a predetermined interval of time following said synchronization switch actuation.

14. An adapter for receiving and supporting a packaged linear array of flashlamps, said adapter being operative in association with a photographic camera of a variety including a housing, a taking lens mounted thereon, mounting means for supporting a flashcube including indexing means engaging post-mounted lugs formed thereupon for rotatably positioning said flashcube for successive igniting of the flashlamps therein and contact terminal means oriented for circuit completing contact with a said flashlamp of said flashcube positioned for scene illumination, said camera further including a shutter mechanism having a synchronization switch actuable in response to actuation of said mechanism for effecting an ignition of a said flashcube flashlamp through said contact terminals, said adapter comprising:

means mountable upon said housing for receiving and supporting said packaged linear flash array and including contact means for establishing electrical interconnection with said array of flashlamps;

a flash firing circuit electrically coupled with said receiving and supporting means contact means for effecting the sequential ignition of select ones of said array of flashlamps when activated by select energization and when actuated by a firing signal of predetermined electrical characteristic;

means for establishing an electrical power supply when connected to a battery source; and control means coupled with said power supply means and connectable in circuit completing relationship with said flashcube mounting means contact terminal means for activating said flash firing circuit and for deriving said firing signal in response to said actuation of said synchronization switch.

15. The adapter of claim 14 having post-mounted lugs corresponding with those of a said flashcube, removably mountable for support within said mounting means and fixed against rotation thereby.

16. The adapter of claim 14 having an outwardly extending lugless post corresponding in dimension with that of a said flashcube and removably mountable within said mounting means in a manner permitting unrestricted operation of said indexing means.

17. The adapter of claim 14 in which said control means includes firing delay means for delaying the introduction of said firing signal a predetermined period of time in response to said actuation of said synchronization switch.

18. The adapter of claim 14 in which said control means is operative to maintain said activation of said flash firing circuit substantially throughout an exposure cycle of said photographic camera, and said flash firing circuit is configured to require an interruption of said activation to carry out the ignition of a next successive one of said flashlamps within said array.

19. The adapter of claim 14 in which said control means includes energization timing means for limiting the extent of said activation of said flash firing circuit to a predetermined period of time.

20. The adapter of claim 19 in which said predetermined period of time is selected in correspondence with the interval of time required for said control means to respond to said synchronization switch actuation and to effect said flash firing circuit ignition of a said flashlamp.

21. The adapter of claim 14 in which said adapter mountable means is configured for removable support upon said housing in a position wherein said packaged flashlamps of said linear array are located at positions above said taking lens.

22. The adapter of claim 14 in which:
said power supply means includes means deriving a power supply of first voltage value, and means deriving a power supply of second voltage value;
said control means is configured for energizing said flash firing circuit at said activating input from said power supply of first voltage value, and for generating said firing signal utilizing said second voltage value.

23. The adapter of claim 14 in which said control means is operative to assert said predetermined electrical characteristic at said flash firing circuit and to effect a said flash firing circuit ignition of a select said flashlamp upon said activation of said flash firing circuit in response to said synchronization switch actuation.

24. The adapter of claim 14 in which said control means comprises:
drive means for energizing said flash firing circuit when activated;
detector means responsive to said synchronization switch actuation for clamping said drive means in a condition establishing said activation; and
timing means for de-activating said drive means and said detector means following a predetermined interval of time from said synchronization switch actuation.

25. An adapter for utilizing a packaged array of flashlamps in association with a photographic camera of a variety including a housing, a taking lens mounted thereon, mounting means for supporting a percussively ignited flashcube including indexing means for rotating said flashcube between successive operating orientations and firing means having a percussing element actuable to move into select firing contact with said flashcube to ignite a flashlamp therein, said shutter mechanism means including means for actuating said percussing element in synchronism with the exposure defining actuation of said mechanism, said adapter comprising:

means mountable upon said housing for receiving and supporting said packaged linear flash array and including contact means for establishing electrical interconnection with said array of flashlamps;

transducer means mountable in contactable association with said percussing element and having a unique condition in response to said actuation of said element;

flash firing circuit means electrically coupled with said receiving and supporting means contact means for effecting the ignition of individual ones of said flashlamps within said array in a predetermined sequence thereof when activated by select energization and when actuated by a firing signal of predetermined electrical characteristic;

means for establishing an electrical power supply when connected to a battery source; and control means electrically coupled with said power supply means and said flash firing circuit means for selectively activating said flash firing means and responsive to said transducer means unique condition in the presence of said activation for deriving said firing signal to actuate said flash firing means.

26. The adapter of claim 25 in which said control means includes firing delay means for delaying the introduction of said firing signal to said flash firing circuit means for a predetermined period of time in response to said unique signal condition.

27. The adapter of claim 26 in which said firing delay means predetermined period of time is selected in correspondence with a period of time for assuring the stability of said transducer means unique signal condition.

28. The adapter of claim 25 in which said control means includes energization timing means for limiting the extent of said activation of said flash firing circuit means for a predetermined period of time.

29. The adapter of claim 28 in which said predetermined period of time is selected in correspondence with the interval of time required for said control means to respond to said unique signal condition and to effect said flash firing circuit means ignition of said flashlamp.

30. The adapter of claim 28 in which said control means further includes energization timing means for limiting the extent of said activation of said flash firing circuit means for a period of time selected in correspondence with the interval of time required for said control means to respond to said unique signal condition and to effect said flash firing circuit means ignition of a said flashlamp.

31. The adapter of claim 25 in which said adapter mountable means is configured for removable support upon said housing in a position wherein said packaged flashlamps of said array are located at positions above said taking lens.

32. The adapter of claim 25 in which:
said power supply means is configured for connection with an electrical power supply deriving a first voltage value and a second voltage value; and
said control means is configured for providing said activation from said power supply of first voltage value, and for generating said firing signal utilizing said second voltage value.

33. The adapter of claim 25 in which said control means is operative to continually assert said firing signal upon said flash firing circuit means and to effect a said flash firing circuit means ignition of a selected said flashlamp upon activation of said firing circuit means in response to said unique signal condition.

34. The adapter of claim 25 in which said control means comprises:
drive means actuable for activating said flash firing circuit means;
detector means responsive to said unique signal condition for clamping said drive means in a condition of said activation; and
timing means for de-actuating said drive means and said detector means a predetermined interval of time following the derivation of said transducer means unique condition.

35. An adapter for utilizing a packaged array of flashlamps in association with a photographic camera of a variety including a housing, a taking lens mounted thereon, output terminals for electrical connection with a source of artificial illumination, a shutter having a synchronization switch actuable to complete an electrical circuit through said output terminals, means for mounting a first electrical power supply, and switch means actuable substantially at the commencement of an exposure cycle of said camera for powering an instrumentality therewithin from said first electrical power supply, said adapter comprising:
means mountable upon said housing for receiving and supporting said packaged flash array and including contact means for establishing electrical interconnection therewith;
flash firing circuit means electrically coupled with said receiving and supporting contact means for effecting the ignition of individual ones of flashlamps within said packaged array in a predetermined sequence thereof when activated by select energization and when actuated by a firing signal of predetermined electrical characteristic;
means for establishing a second electrical power supply when connected to a battery source; and
control means responsive to said switch means actuation for activating said flash firing circuit means by energization from said second power supply and responsive to said synchronization switch actuation for deriving said firing signal of predetermined electrical characteristic from said second electrical power supply.

36. The adapter of claim 35 in which said control means includes:
a transistor stage connected in switching relationship between said flash firing circuit means and said second power supply; and
means connecting said transistor stage with said first power supply in response to said switch means actuation for biasing said transistor stage into a condition to activate said flash firing means by energization from said second electrical power supply.

* * * * *